United States Patent
Omori

(10) Patent No.: US 7,122,780 B2
(45) Date of Patent: Oct. 17, 2006

(54) EXPOSURE APPARATUS WITH EFFICIENT UNIFORM LIGHT OUTPUT

(75) Inventor: Toshihiko Omori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 37 days.

(21) Appl. No.: 10/761,417

(22) Filed: Jan. 22, 2004

(65) Prior Publication Data

US 2004/0213530 A1 Oct. 28, 2004

(30) Foreign Application Priority Data

Jan. 23, 2003 (JP) ............................. 2003-014477

(51) Int. Cl.
*G01B 11/02* (2006.01)
(52) U.S. Cl. ...................... 250/216; 385/116
(58) Field of Classification Search ............... 250/548, 250/216, 231, 227.11; 385/116; 359/619, 359/319; 356/494
See application file for complete search history.

(56) References Cited

U.S. PATENT DOCUMENTS

| 5,098,184 | A | | 3/1992 | van den Brandt et al. |
| 5,949,503 | A | * | 9/1999 | Koyama ...................... 349/41 |
| 2002/0196414 | A1 | * | 12/2002 | Manni .......................... 353/31 |

* cited by examiner

*Primary Examiner*—Thanh X. Luu
*Assistant Examiner*—Tony Ko
(74) *Attorney, Agent, or Firm*—Sughrue Mion, PLLC

(57) ABSTRACT

An object of the present invention is to provide an exposure apparatus which is capable of obtaining high illumination efficiency and performing uniform exposure. In accordance with the exposure apparatus that includes a light source, an optical integrator to which light is supplied from the light source and a two-dimensional spatial light modulator illuminated by light which has transmitted the optical integrator, an optical fiber bundle end portion for emitting light to the optical integrator is provided in the light source, and the light-emitting area of the optical fiber bundle end portion is, as seen from the light-emitting side, substantially similar to the contour configuration of light-emitting surface of the optical integrator. Thus, most of the light emitted from the optical fiber bundle end portion can be illuminated onto a set illumination area. As a result, high illumination efficiency can be obtained and uniform exposure can be realized.

24 Claims, 10 Drawing Sheets

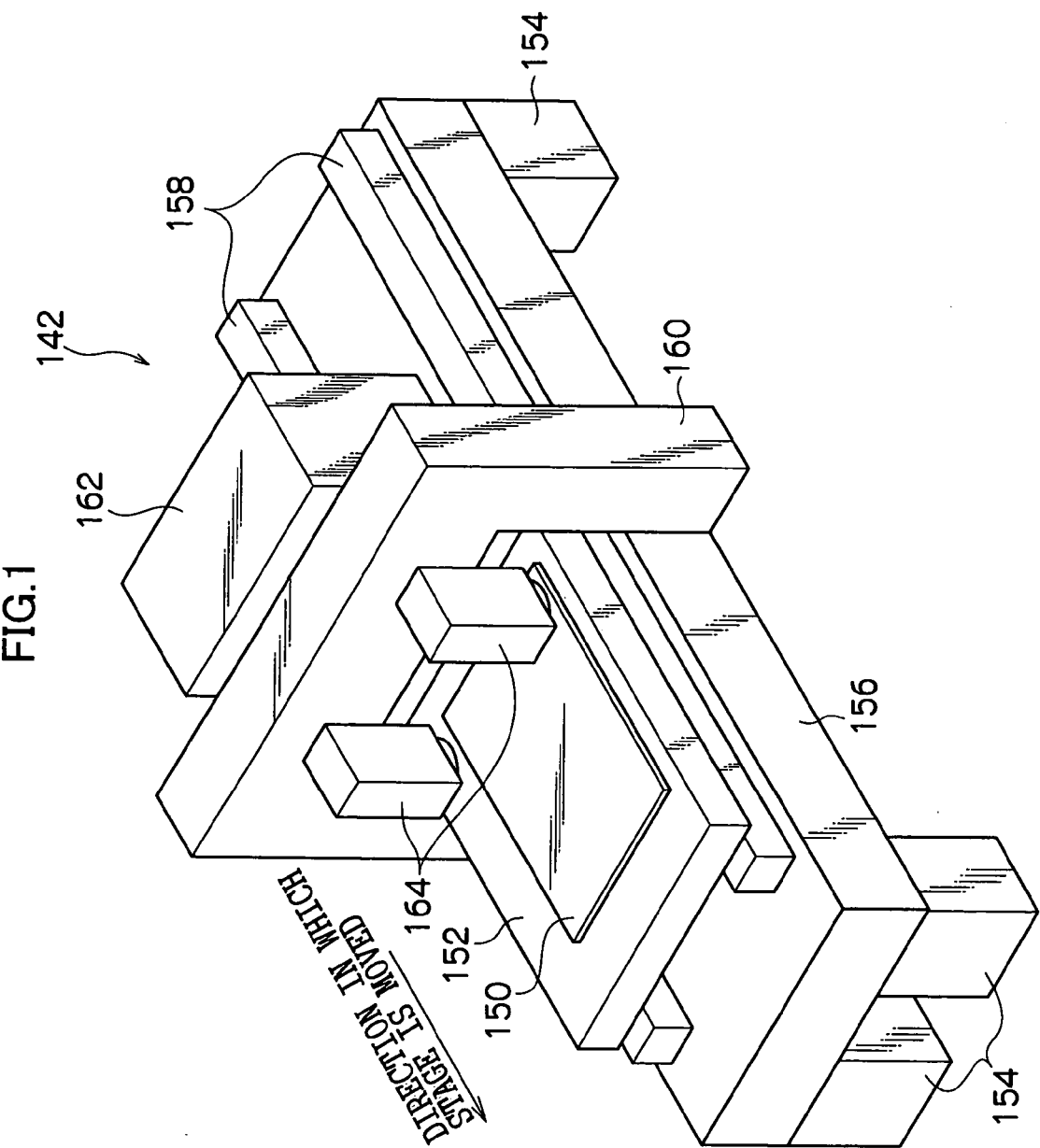

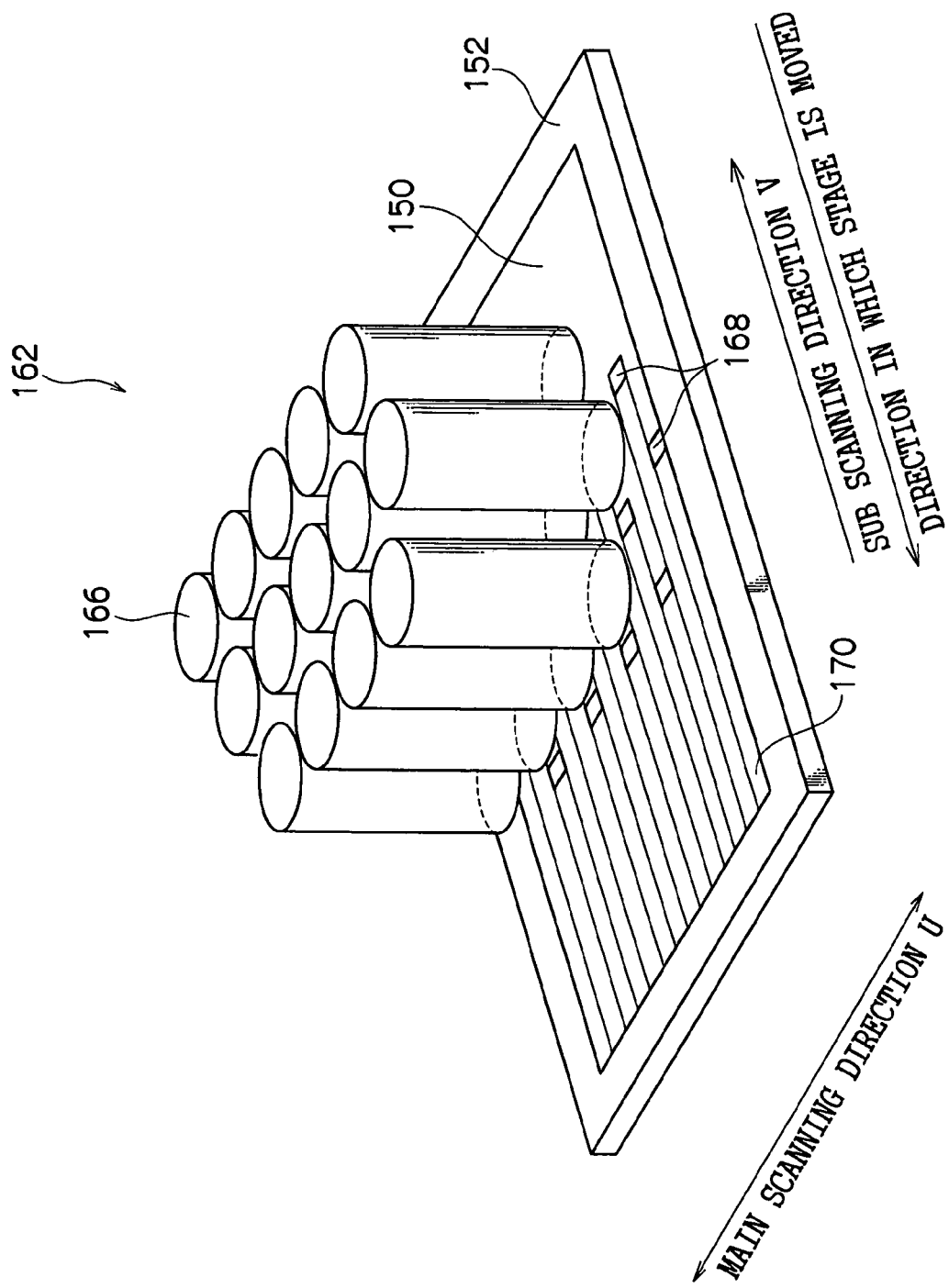

EXPOSURE APPARATUS WITH EFFICIENT UNIFORM LIGHT OUTPUT

CROSS-REFERENCE TO RELATED APPLICATION

This application claims priority under 35 USC 119 from Japanese Patent Application, No. 2003-14477, the disclosure of which is incorporated by reference herein.

BACKGROUND OF THE INVENTION

1. Field of the Invention

The present invention relates to an exposure apparatus, and in particular to an exposure apparatus which is capable of improving illumination efficiency and performing uniform exposure.

2. Description of the Related Art

An exposure apparatus is known, which has an illumination optical system for illuminating a two-dimensional spatial light modulator (which hereinafter is referred to as a two-dimensional SLM) such as an LCD (liquid crystal display) or a DMD (digital micromirror device; trademark) with light from a light source, and which exposes an optical image controlled by the two-dimensional SLM onto a photosensitive material. The two-dimensional SLM must be uniformly illuminated in such an exposure apparatus. An optical integrator is used for the illumination optical system. The optical integrator is generally used for a projector as well as an exposure apparatus (e.g., see Japanese Patent Application Laid-Open (JP-A) No. 3-111806).

The optical integrator divides a luminous flux, passes the divided luminous fluxes through different paths and then re-couples the fluxes in order to eliminate a correlation between intensity and position (distribution of intensity) and to uniform the intensity. There provided two systems for the optical integrator in accordance with a system for dividing a luminous flux. (1) One is a fly-eye type for spatially dividing a luminous flux by using a lens array (fly-eye lens) in which lenses are two-dimensionally arranged. (2) The other is a rod type for angularly dividing a luminous flux by multiple reflection by using a glass rod or a hollow rod with its inner surface being a mirror.

In the fly-eye type, two fly-eye lenses are used. A first fly-eye lens converges light onto lens cells of a second fly-eye lens. A light source image is imaged on the lens cells of the second fly-eye lens. The second fly-eye lens images the images which are on lens cells of the first fly-eye lens onto a two-dimensional SLM. In the rod type, a light source image is imaged on an incident surface of a rod, and an image at the exit surface of the rod is imaged on a two-dimensional SLM.

When a lamp such as an ultrahigh pressure mercury-vapor lamp is used for a light source, the configuration of light-emitting portion of the lamp is totally different from the configuration of an illumination area of a two-dimensional SLM (i.e., the configuration of an area of the two-dimensional SLM to be illuminated). Nevertheless, the above-described integrator enables uniform illumination only on a required area on the two-dimensional SLM to be used.

In actuality, in the case that Etendue is large and the configuration of the light-emitting portion is different from the configuration of an area illuminated by the light reaching a two-dimensional SLM as in the case of a lamp, entire light emitted from the lamp cannot be effectively utilized, resulting in a decreased illumination efficiency.

A description will be given with a specific example. When a lamp and a fly-eye type integrator are used, an arc image of the lamp is imaged by a first fly-eye lens onto cells of a second fly-eye lens. When an area to be used on a two-dimensional SLM is formed in a rectangular, the lens cells of the fly-eye lens are formed in a similar configuration to the area to be illuminated in order to image images which are on the lens cell. It is designed so that the size of the arc image of the lamp is equal to or smaller than the size of the second fly-eye lens. Actually, however, it is difficult for all light source images to enter the lens cells because of the size of light source (the size of light-emitting portion of the lamp, i.e., the arc size), spread of light and aberration of lenses. For this reason, there arise problems in that an optical performance is deteriorated, illumination efficiency is decreased and uniformity of illumination is deteriorated.

In view of the above-described facts, an object of the present invention is to provide an exposure apparatus which is capable of obtaining high illumination efficiency and performing uniform exposure.

SUMMARY OF THE INVENTION

The present inventors noted that a light source which has a light-emitting portion substantially similar to the configuration of lens cells of a fly-eye lens (the configuration of the light-emitting portion of a rod), i.e., the contour configuration of an exit surface of an optical integrator can guide most of light emitted from the light-emitting portion to an illumination area and improve illumination efficiency and illumination uniformity. The light-emitting portion in which end portions of optical fibers are bound as a bundle is usually formed in a hexagonal configuration (substantially circular configuration) as illustrated in FIG. 10. The present inventors found that the configuration of the light-emitting portion could be freely formed, and as the result of diligent study, arrived at the present invention.

According to a first aspect of the present invention, there is provided an exposure apparatus including: a light source; an optical integrator to which light is supplied from the light source; and a two-dimensional spatial light modulator illuminated by light which has transmitted the optical integrator, wherein the light source includes an optical fiber bundle in which a plurality of optical fibers are arranged and light is emitted from the plurality of optical fibers, and the configuration of a light-emitting area formed at the end portion of the optical fiber bundle is, as seen from a light-emitting side, substantially similar to the contour configuration of the light exit surface of the optical integrator.

An optical fiber bundle refers herein to as an end portion in which end portions of a large number of optical fibers are bound. The optical fiber bundle may be formed in any configurations.

In order to supply light to the entering side of the optical fiber bundle, a lamp may be used or an LD (laser diode) may be used. When an LD is used, the LD is coupled to the entering side of the optical fiber. Alternatively, a plurality of LDs may be coupled to an optical fiber. This can increase the power of light while maintaining decreased Etendue. Further, a broad area type laser diode array including a plurality of emitters may be used.

In accordance with the first aspect of the exposure apparatus of the present invention, most of light emitted from the optical fiber bundle end portion can be guided to an illumination area to be illuminated by light reaching the two-dimensional spatial light modulator. Thus, high illumination efficiency can be obtained and uniform exposure can be realized.

The optical integrator is usually a fly-eye type or a rod type.

As the number of optical fibers is increased, the size of the optical fiber bundle end portion increases. Namely, Etendue at the light source side increases. If Etendue at the light source side is larger than that at the side of the two-dimensional spatial light modulator, illumination efficiency is decreased. For this reason, in the case of a large number of optical fibers, a diameter of a core or a clad of each of the optical fibers is decreased, so that a decrease in illumination efficiency can be prevented.

When a DMD is used as the two-dimensional spatial light modulator, light is entered in a tilted manner by a predetermined angle with respect to the optical axis of each of mirror surfaces of the DMD from a direction in which the mirrors are tilted (i.e., light is entered from a predetermined diagonal direction of the mirror surface). Thus, even if the configuration of the optical fiber bundle end portion is, as seen from the light emitting side, a rectangular configuration for example, a configuration obtained by deforming the rectangular is provided on each of the surfaces of the DMD. Nevertheless, because the amount of deformation is small, this configuration may be considered as a substantial rectangular configuration. Accordingly, in the case of using a DMD as the two-dimensional spatial light modulator, the configuration of the optical fiber bundle end portion can be, as seen from the light emitting side, substantially similar to the contour configuration of the exit surface of the optical integrator.

Because the DMD is not deteriorated by UV light unlike an LCD (liquid crystal display), a photosensitive material with high sensitivity for UV light can be exposed with high illumination efficiency.

According to a second aspect of the present invention, there is provided an exposure apparatus including: a light source device; an optical integrator to which light is supplied from the light source device; and a two-dimensional spatial light modulator illuminated by light which has transmitted the optical integrator, wherein the light source device includes a light source portion and an optical fiber bundle in which a plurality of optical fibers coupled to the light source portion are arranged and light is emitted from the plurality of optical fibers, and the configuration of light-emitting area formed at an end portion of the optical fiber bundle is, as seen from the light-emitting side, substantially similar to the contour configuration of the light-emitting surface of the optical integrator.

In accordance with a third aspect of the exposure apparatus of the present invention, there is provided an exposure apparatus including a plurality of exposure heads, wherein each of the plurality of exposure heads includes a light source, an optical integrator to which light is supplied from the light source, and a two-dimensional spatial light modulator illuminated by light which has transmitted the optical integrator, and the light source includes an optical fiber bundle in which a plurality of optical fibers are arranged and light is emitted from the plurality of optical fibers, and the configuration of light-emitting area formed at an end portion of the optical fiber bundle is, as seen from the light-exiting side, substantially similar to the contour configuration of the light-exiting surface of the optical integrator.

BRIEF DESCRIPTION OF THE DRAWINGS

FIG. 1 is a perspective view illustrating an exterior of an exposure apparatus according to an embodiment of the present invention.

FIG. 2 is a perspective view illustrating a structure of a scanner for the exposure apparatus according to the embodiment of the present invention.

DETAILED DESCRIPTION OF THE INVENTION

Figure 3A:
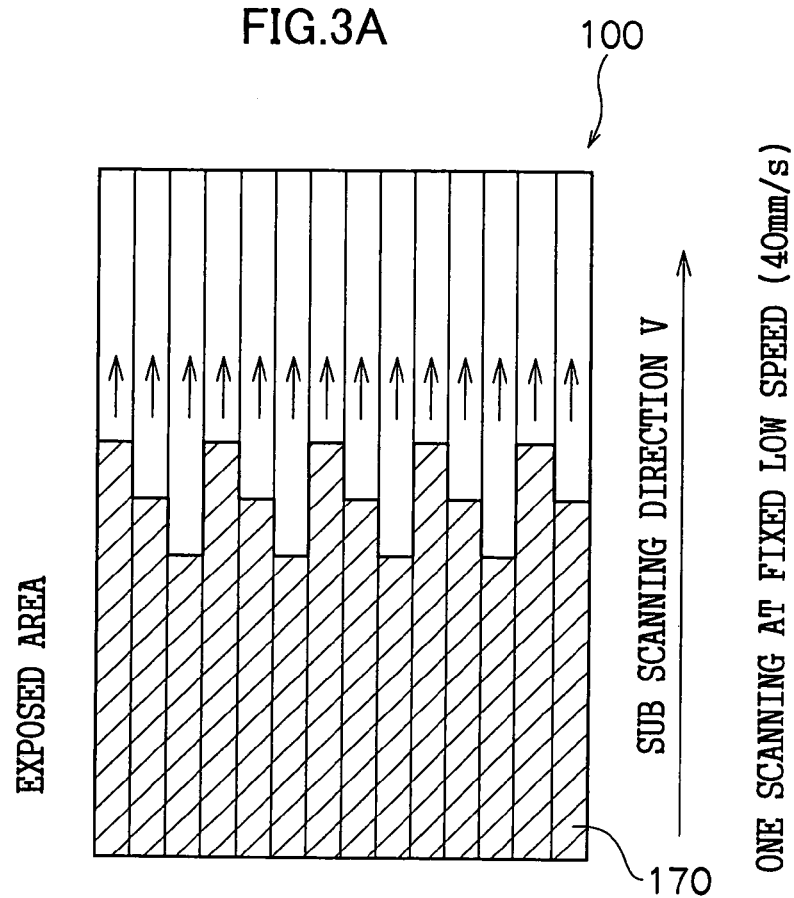
FIG. 3A is a plan view of an exposed area formed on a photosensitive material.

Embodiments of the present invention will be described hereinafter by examples. An exposure apparatus 142 according to an embodiment of the present invention comprises, as illustrated in FIG. 1, a flat plate shaped stage 152 which attracts a sheet shaped photosensitive material 150 on its surface so as to hold the same. Disposed on the top surface of a thick plate shaped mount 156 supported by four legs 154 are two guides 158 extending along a direction in which the stage is moved. The stage 152 is disposed so that its longitudinal direction is along the direction in which the stage is moved, and reciprocably supported by the guides 158. The exposure apparatus 142 is provided with an unillustrated driver for driving the stage 152 along the guides 158.

A gate 160 with a U-shaped configuration is provided at the central portion of the mount 156 so as to bridge over a movement path for the stage 152. End portions of the gate 160 are respectively fixed to side surfaces of the mount 156. A scanner 162 is provided on one side of the gate 160, and a plurality of (e.g., two) detection sensors 164 for detecting leading and trailing edges of the photosensitive material 150 are provided on the other side of the gate 160. The scanner 162 and the detection sensors 164 are mounted to the gate 160 so as to be disposed in a fixed manner above the movement path for the stage 152. The scanner 162 and the detection sensors 164 are connected to an unillustrated controller for controlling such components.

Figure 3B:
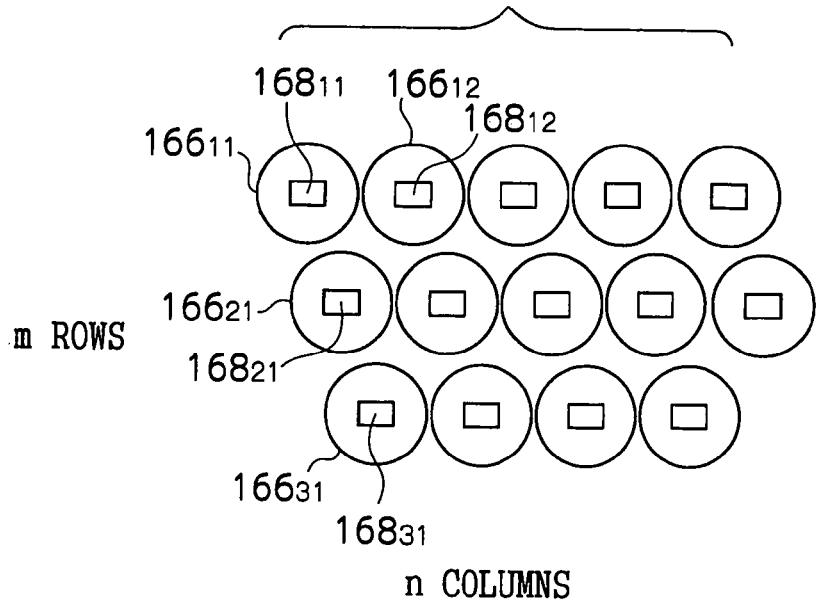
FIG. 3B is a plan view illustrating the arrangement of exposure heads in an exposed area.

The scanner 162 comprises, as illustrated in FIGS. 2 and 3B, a plurality of (e.g., 14) exposure heads 166 arranged in a substantial matrix of m rows and n columns (e.g., three rows and five columns). According to this example, only four exposure heads 166 are arranged on the third row because of the relationship with the width of the photosensitive material 150. An exposure head $166_{ij}$ indicates an exposure head arranged in the j-th column on the i-th row. The exposure heads have the same structure.

Each of exposure areas 168 by the exposure heads 166 is formed in a rectangular shape with its short side being along a sub-scanning direction V. Thus, in accordance with movement of the stage 152, a band shaped exposed area 170 is formed on the photosensitive material 150 for each of the exposure heads 166. An exposure area $168_{ij}$ indicates an exposure area formed by an exposure head arranged in the j-th column on the i-th row.

As illustrated in FIGS. 3A and 3B, for the purpose of arranging the band shaped exposed areas 170 along a direction perpendicular to the sub scanning direction without intervals therebetween, the exposure heads linearly arranged on the respective rows are shifted in an arrangement direction thereof by a predetermined interval (multiplication of a natural number and the long side of an exposure area, in this embodiment, twice the long side of the exposure area). Thus, an unexposed portion between the exposure area $168_{11}$ and the exposure area $168_{12}$ on the first row can be exposed by the exposure area $168_{21}$ on the second row and the exposure area $168_{31}$ on the third row.

[Structure of Exposure Head]

Because the exposure heads $166_{11}$ to $166_{mn}$ have the same structure, the structure of one of them will be described hereinafter.

Figure 4:
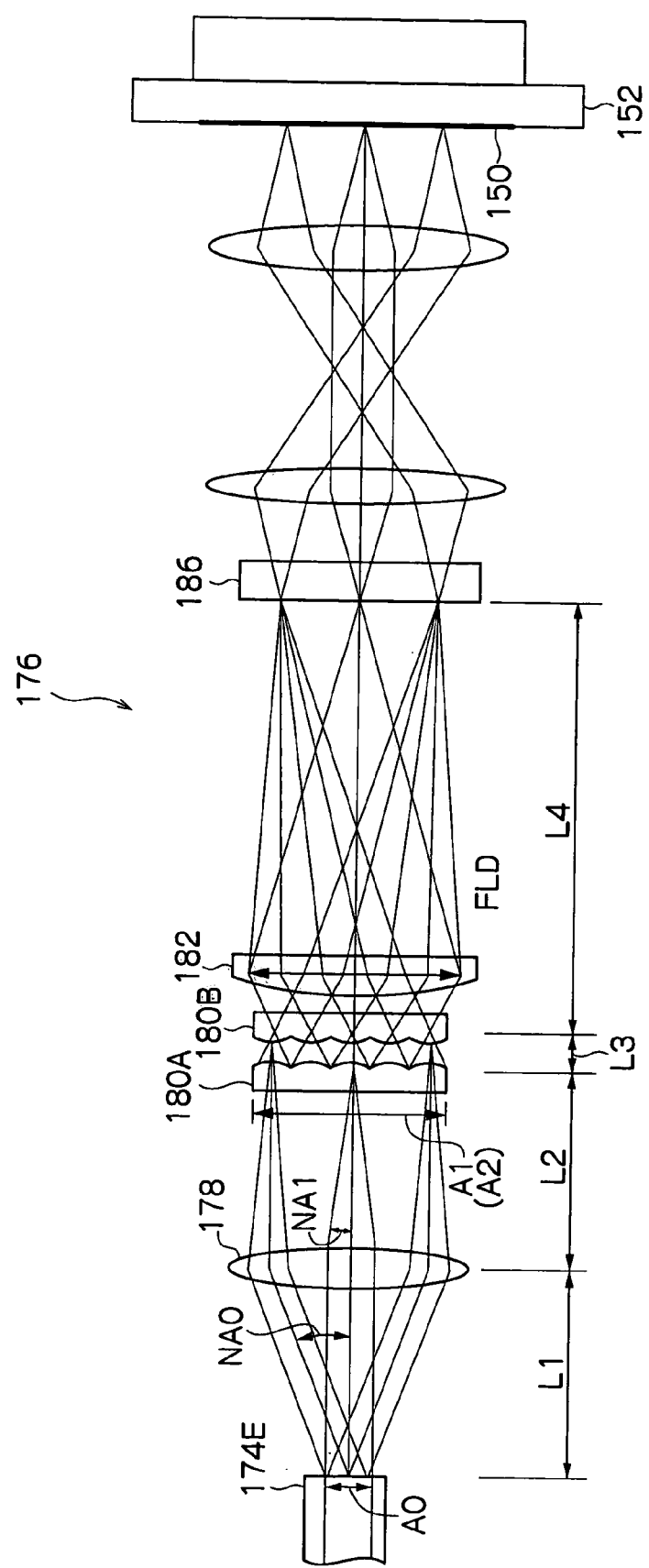
FIG. 4 is a schematic view illustrating a structure of an exposure head of the exposure apparatus according to the embodiment of the present invention.

As illustrated in FIG. 4, the exposure head 166 comprises, as a light source, a large number of optical fibers 174 with their light-emitting end portions being bundled to be an optical fiber bundle end portion 174E, and an LD coupled to the large number of optical fibers 174.

Further, the exposure head 166 comprises an optical integrator 176 as an illumination optical system that light emitted from the optical fiber bundle end portion 174E enters. The optical integrator 176 comprises a collimator lens 178 for converging the light from the optical fiber bundle end portion 174E, two fly-eye lenses 180A and 180B for successively transmitting the converged light which has transmitted the collimator lens 178, and a field lens 182.

The exposure head 166 is provided with a two-dimensional SLM (two-dimensional spatial light modulator) 186 for modulating the light which has transmitted the field lens 182.

Figure 5:
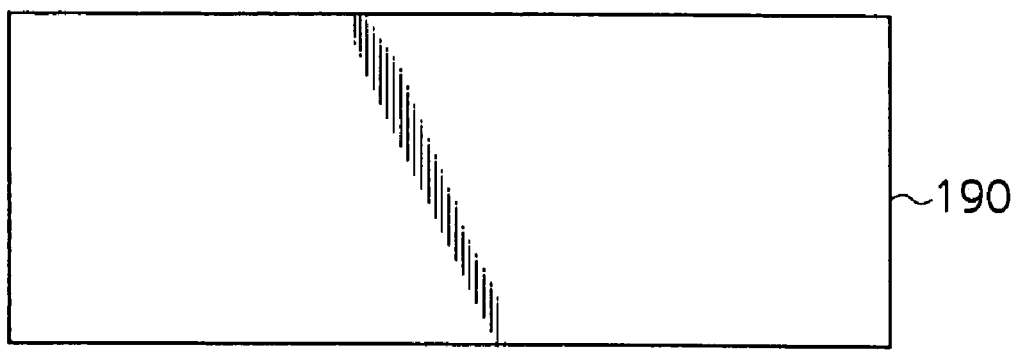
FIG. 5 is a plan view of a set illumination area on a two-dimensional SLM in the exposure apparatus according to the embodiment of the present invention.
Figure 6A:
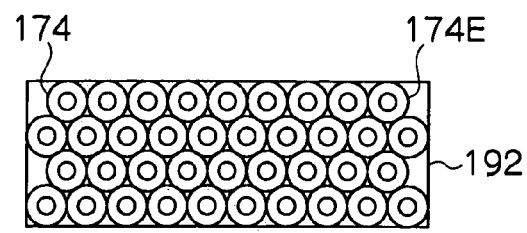
FIG. 6A is a front view of an optical fiber bundle end portion in the exposure apparatus according to the embodiment of the present invention.

As illustrated in FIG. 5, a set illumination area 190 intended for illuminating the two-dimensional SLM 186 is formed in a rectangular shape. As illustrated in FIG. 6A, the optical fiber bundle end portion 174E forms, as seen from the light-emitting side, a light-emitting area 192 which is substantially similar to the set illumination area 190. Thus, light from the optical fiber bundle end portion 174E can be utilized as illumination light without being wasted, and high illumination efficiency can be obtained.

Figure 6B:
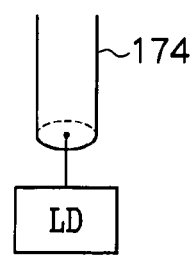
FIG. 6B is a schematic view of an optical fiber coupled to an LD.
Figure 6C:
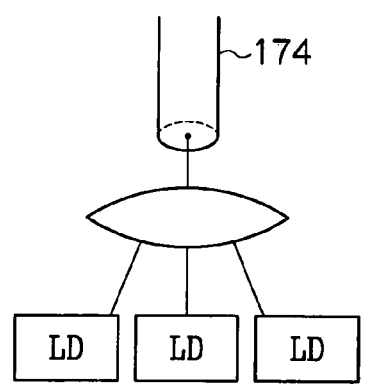
FIG. 6C is a schematic view of an optical fiber coupled to a plurality of LDs.
Figure 6D:
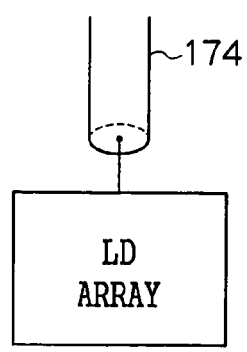
FIG. 6D is a schematic view of an optical fiber coupled to an LD array.

In order to supply light to the entering side of the optical fiber bundle, a lamp may be used or an LD (laser diode) may be used. When an LD is used, the LD is coupled to the entering side of the optical fiber (FIG. 6B). Alternatively, a plurality of LDs may be coupled to an optical fiber (FIG. 6C). This can increase the power of light while maintaining decreased Etendue. Further, a broad area type laser diode array including a plurality of emitters may be used (FIG. 6D).

Figure 7:
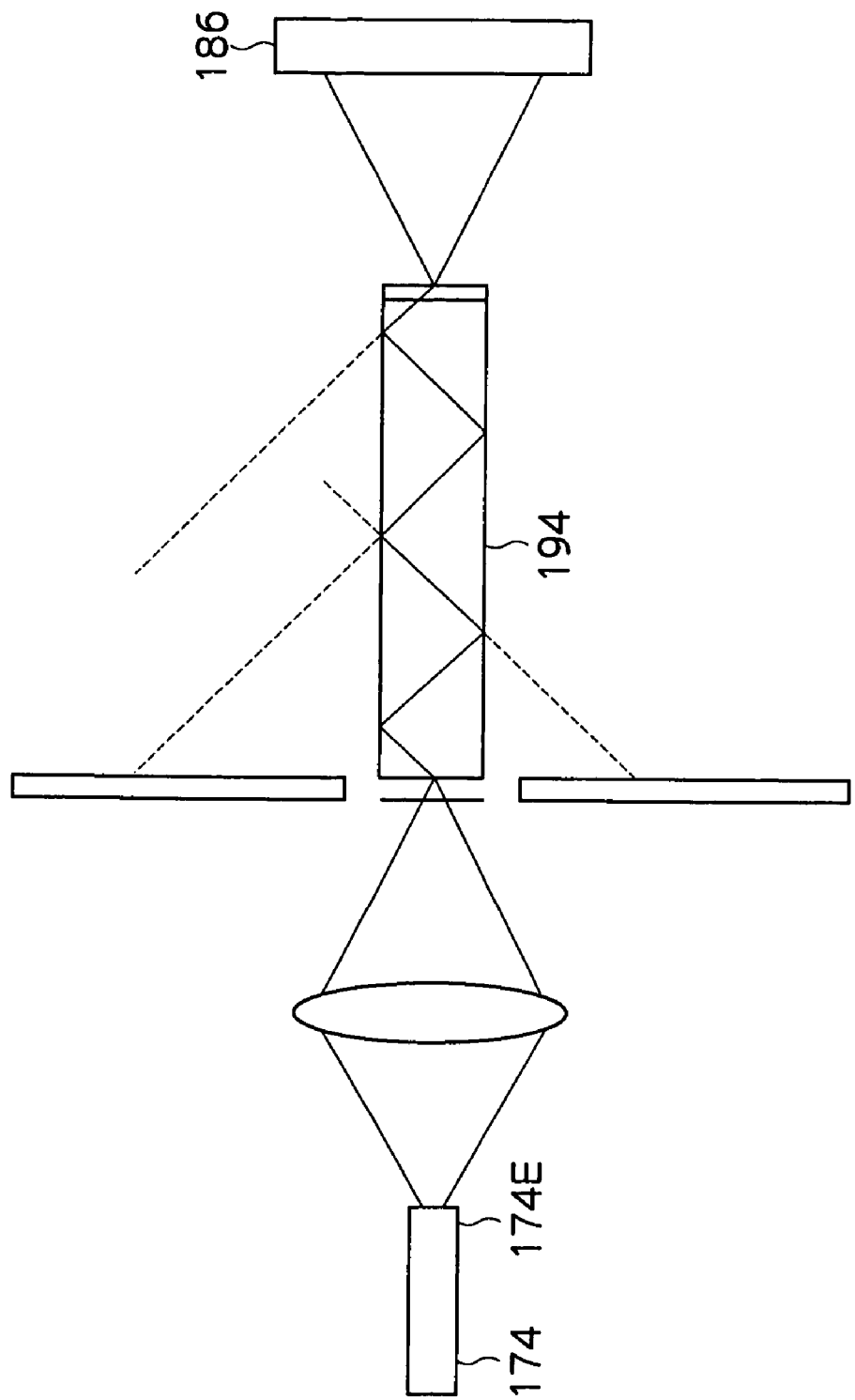
FIG. 7 is a schematic view illustrating a modified example for the exposure head in the exposure apparatus according to the embodiment of the present invention.

There may be provided an exposure apparatus having, instead of a fly-eye lens type exposure head, a rod type exposure head utilizing a rod 194 made of glass as illustrated in FIG. 7. This can simplify the structure of the apparatus.

[Characteristics of Illumination Optical System and Arrangement Position Thereof]

FIG. 4 illustrates an example of simplified view of the illumination optical system. With respect to the fly-eye lens 180A, the size of its lens cells is S1, the number of lens cells is N1, its longitudinal length is A1 and its focal distance is ML1F. Its converging size is Z1 (=2×ML1F×NA1). With respect to the fly-eye lens 180B, its lens cell size S2 (=S1), the number of lens cells N2 (=N1) and its longitudinal direction length A2 (=A1) are the same as those in the fly-eye lens 180A. Its focal distance is ML2F. The longitudinal length FLD of the field lens 182 is substantially equal to A2. The two-dimensional SLM 186 is arranged so that the focal distance FLF of the field lens 182 is substantially equal to the distance L4 from the fly-eye lens 180B to the two-dimensional SLM 186.

The distance L1 from the optical fiber bundle end portion 174E to the collimator lens 178 and the distance L2 from the collimator lens 178 to the fly-eye lens 180A are equal to the focal distance CL2F of the collimator lens 178. The distance L3 from the fly-eye lens 180A to the fly-eye lens 180B is equal to the focal distance ML1F of the fly-eye lens 180A.

Assuming that a length of the optical fiber bundle end portion 174E in one direction is A0, the radiation angle of light from the optical fiber bundle end portion 174E is NA0 and a converging angle toward the fly-eye lens 180A is NA1. A basic formula for the illumination system can be represented by the following.

$$A0 \cdot NA0 = A1 \cdot NA1$$

(i.e., $A0 \cdot NA0 = N1 \cdot S1 \cdot NA1$)

An imaging characteristic can be represented by the following formula.

$$1/L3 + 1/L4 = 1/ML2F$$

(i.e., $1/ML1F + 1/L4 = 1/ML2F$)

A magnification characteristic can be represented by the following formula.

$$ACS/S1 = L4/L3$$

(i.e., $ACS/S1 = L4/ML1F$)

A converging characteristic can be represented by the following formula with a converging size (diameter) by the fly-eye lens 180A being Z1.

$$Z1 = 2 \cdot ML1F \cdot NA1$$

Illumination $FN_0$ can be represented as follows.

$$SFN_0 = FLF/FLD (\approx L4/L2)$$

[Concept of Etendue]

Figure 8:
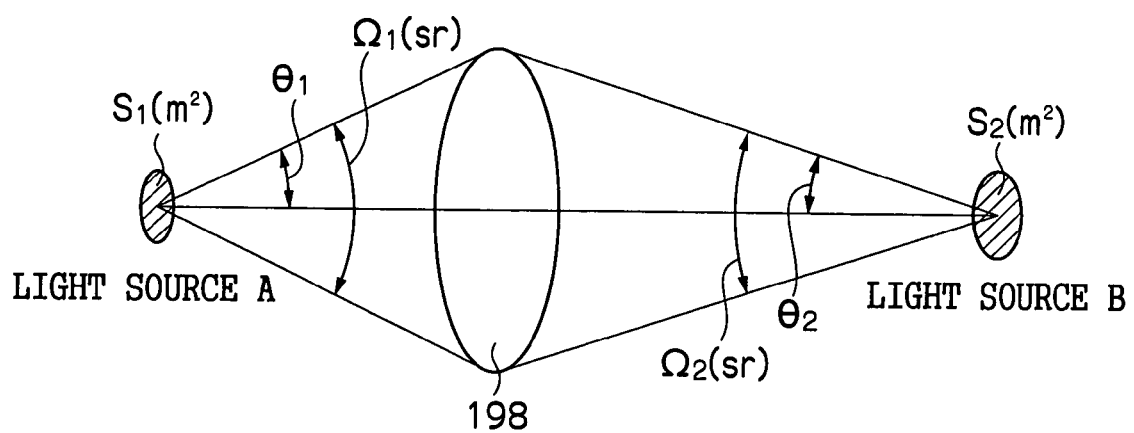
FIG. 8 is a schematic view for explaining the principle of Etendue.

Illuminating an SLM (spatial light modulator) means imaging an image of a light source onto the SLM. When an optical magnification is indicated by β, as illustrated in FIG. 8, an area $S_2$ of an image is in proportion to $β^2$ ($S_2=β^2S_1$), and an angle θ formed by light and an optical axis is in inverse proportion to the magnification β ($θ_2=θ_1/β$) Namely, the following equation can be derived.

$$S_1θ_1^2 = S_2θ_2^2$$

Because a solid angle Ω is substantially in proportion to $θ^2$, the following expression can be derived.

$$Ω_1S_1≈Ω_2S_2$$

Namely, the product of the area of a light source and the solid angle is constant. Strictly speaking, transmission of luminous flux by a perfect lens (with 100% of transmittance and no aberration) 198 can be represented as follows.

luminous flux: $e=\int S\int Ω\cos θ·dS·dΩ$

When θ is sufficiently small (F is equal to or larger than 2.5), $\cos θ≈1$. Thus, the following expression can be given.

luminous flux: $e≈Ω_1S_1≈Ω_2S_2$

"ΩS" in the expression is Etendue. Assuming an ideal optical system with 100% of transmittance and no aberration, Etendue is conserved (It is known that Etendue is conserved even if a conjugate relationship is not provided.).

The light source B in FIG. 8 is assumed to be a two-dimensional SLM. If Etendue of the light source A is smaller than that of the two-dimensional SLM, illumination with significantly high efficiency can be realized.

(Example of Calculation)

Etendue at the light source side is indicated by Es.

(1) Case of Discharge Lamp with 4 mm of Arc length

When the light source is a cylinder with a diameter of 1 mm and a length of 4 mm, and light is emitted in an isotropic manner from its side surface, the following expression is derived. (Etendue is large.)

$$Es=π·1·4·2π≈80 \text{ mm}^2·str$$

(2) Case of Fiber Light Source

When the size of bundle exit portion is 0.7×0.7 mm and NA is 0.2 (≈11.5 deg), the following expression is derived. (Etendue is significantly small.)

$$Es=2π·(1-\cos 11.5)·0.7·0.7≈0.06 \text{ mm}^2·str$$

EXAMPLES

Figure 9B:
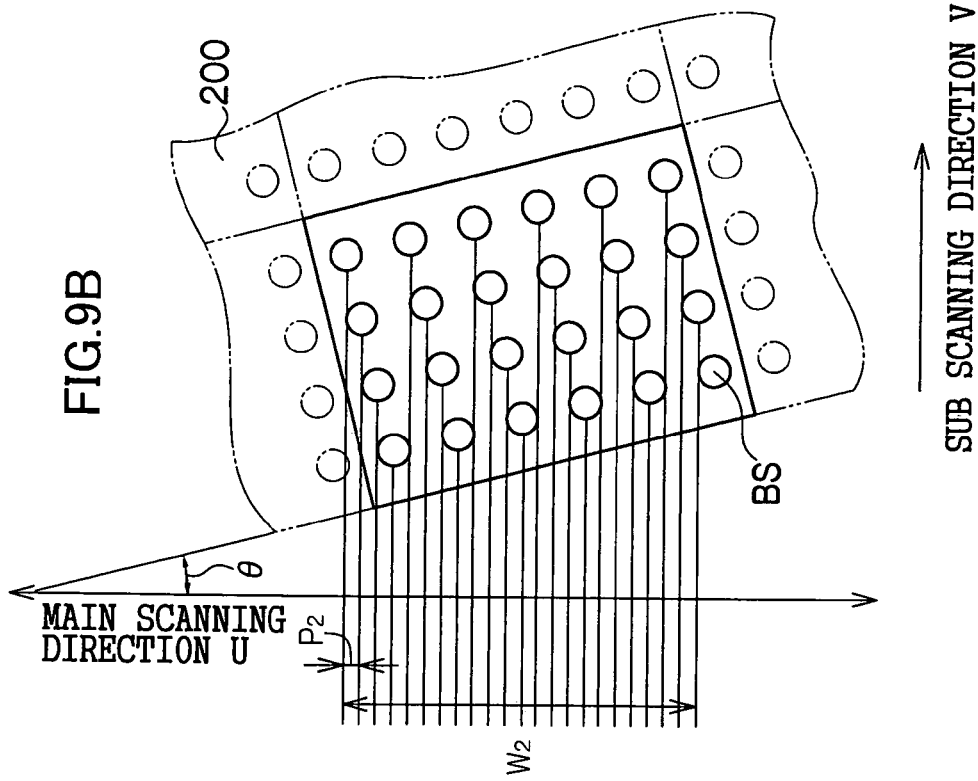
FIG. 9B is a schematic view for comparing positions of beams entering a DMD to a scanning line emitted from the DMD in the case that the DMD is arranged in a tilted manner.
Figure 9A:
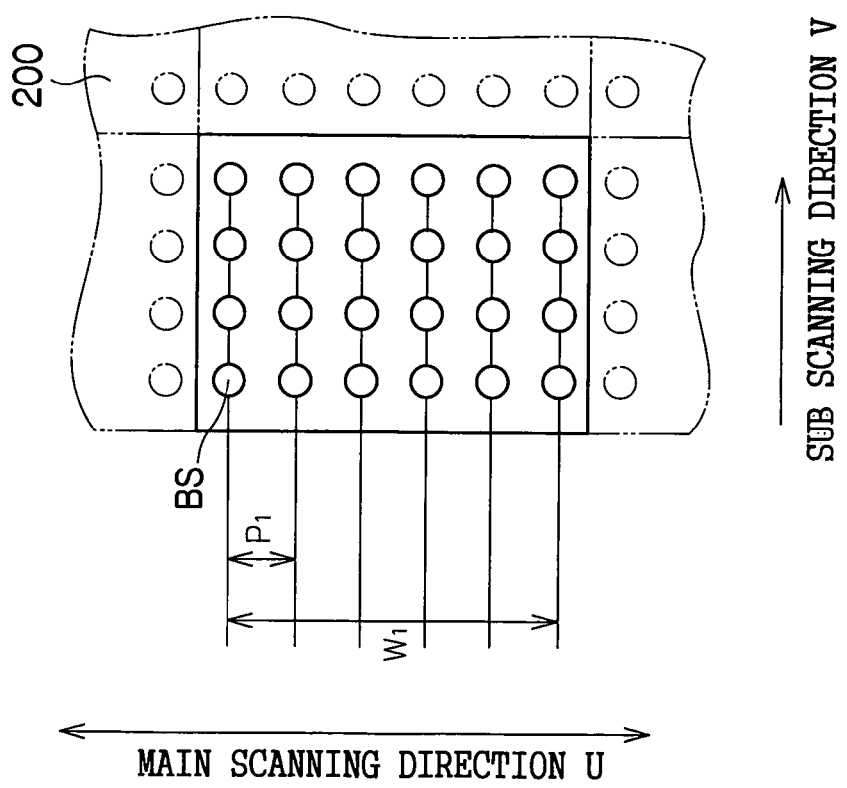
FIG. 9A is a schematic view for comparing positions of beams entering a DMD to a scanning line emitted from the DMD in the case that the DMD is not arranged in a tilted manner.
Figure 10:
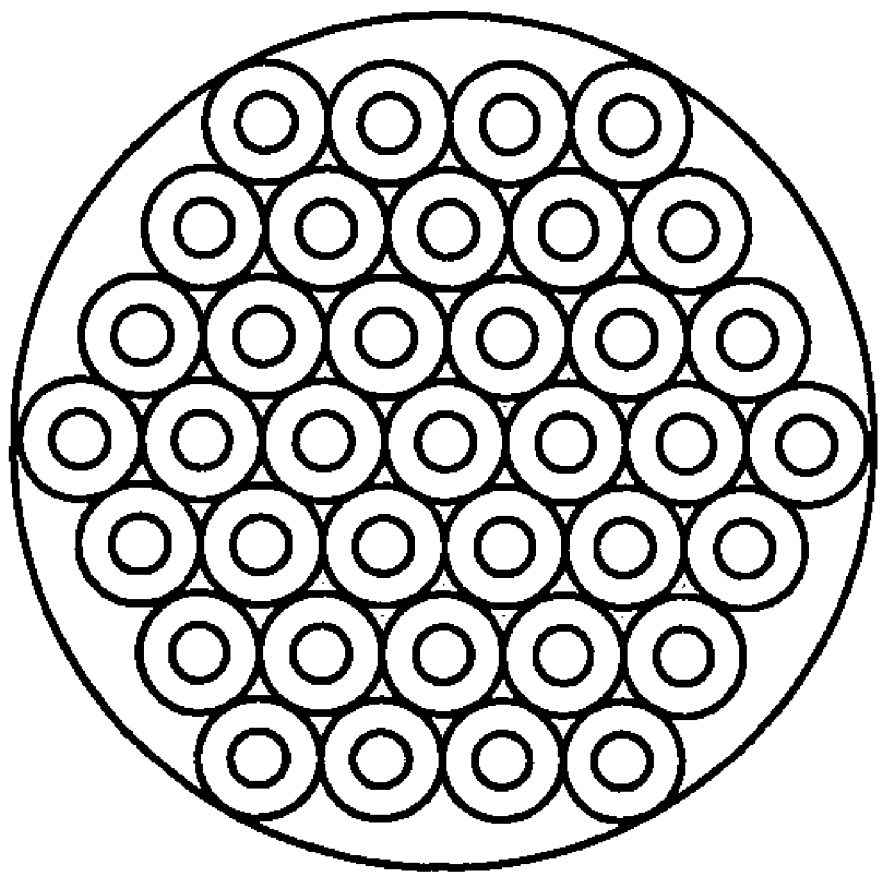
FIG. 10 is a front view of a conventional optical fiber bundle end portion.

A description will be given by tanking the case of using a DMD as the two-dimensional SLM 186 as an example. As illustrated in FIGS. 9A and 9B, a DMD 200 serving as the two-dimensional SLM is provided for each of the exposure heads $166_{11}$ to $166_{mn}$. The DMD 200 modulates an incident light beam in accordance with image data on a pixel-by-pixel basis.

FIG. 9A illustrates scanning loci of real images (beam spots BS) of pixel portions in the case in which the DMD 200 is not tilted with respect to a main scanning direction U. FIG. 9B illustrates scanning loci of beam spots BS in the case in which the DMD 200 is tilted with respect to the main scanning direction U. The DMD 200 is preferably arranged so as to be tilted a little so that a predetermined angle θ (e.g., 0.1° to 1°) is formed by a direction of its side and the main scanning direction U.

In the DMD 200, a large number of (e.g., 600) pixel columns, in each of which a large number of (e.g., 800) pixel portions are arranged along a longitudinal direction (a direction of row), are arranged in a transverse direction. As illustrated in FIG. 9B, by tilting the DMD 200, a pitch $P_2$ between scanning loci (scanning lines) of beam spots BS emitted from pixel portions becomes narrower than a pitch $P_1$ between scanning lines in the case that the DMD 200 is not tilted, resulting in a significant improvement in resolution. Because the angle at which the DMD 200 is tilted is small, a scanning width $W_2$ in the case that the DMD 200 is tilted is substantially the same as a scanning width $W_1$ in the case that the DMD 200 is not tilted.

The substantially same position (dot) on the same scanning line is exposed repeatedly (subjected to multiple exposure) by different pixel columns. Because of such multiple exposure, a fine amount at an exposed position can be controlled and highly fine exposure can be realized. Seams between a plurality of exposure heads arranged along the main scanning direction U can be jointed by controlling fine amounts at exposed positions without steps being formed therebetween. At this time, the amount of deformation is small.

As described above, in accordance with this example, the DMD 200 which is not deteriorated by UV light unlike an LCD (liquid crystal display) is provided as a two-dimensional SLM. Thus, a photosensitive material which is sensitive to UV light can be uniformly exposed with high illumination efficiency.

Although the embodiments of the present invention have been described with examples, the examples are merely an illustration and can be variously changed within the scope that falls within the spirit of the invention. Further, it is needless to say that the scope of the present invention is not limited by the example.

What is claimed is:

1. An exposure apparatus comprising:
    a light source;
    an optical integrator to which light is supplied from the light source; and
    a two-dimensional spatial light modulator illuminated by light which has transmitted the optical integrator,
    wherein the light source comprises an optical fiber bundle in which a plurality of optical fibers are arranged and light is emitted from the plurality of optical fibers, and
    the configuration of a light-emitting area formed at an end portion of the optical fiber bundle is, as seen from the light-emitting side, substantially similar to the contour configuration of the light-emitting surface of the optical integrator,
    wherein an etendue of the light source is smaller than that of the two-dimensional spatial light modulator.

2. The exposure apparatus according to claim 1, wherein the optical integrator is a fly-eye type.

3. The exposure apparatus according to claim 1, wherein the optical integrator is a rod type.

4. The exposure apparatus according to claim 1, wherein the two-dimensional spatial light modulator is a digital micromirror device.

5. The exposure apparatus according to claim 1, wherein the two-dimensional spatial light modulator is disposed in a tilted manner so that a predetermined angle is formed by a direction of a side of the two-dimensional spatial light modulator and a main scanning direction for exposure.

6. The exposure apparatus according to claim 5, wherein the predetermined angle is in the range of 0.1° to 1°.

7. The exposure apparatus according to claim 1, wherein a diameter of at least one of a core and a clad of each of the plurality of optical fibers is changed depending on the number of the plurality of optical fibers.

8. An exposure apparatus comprising:
a light source device;
an optical integrator to which light is supplied from the light source device; and
a two-dimensional spatial light modulator illuminated by light which has transmitted the optical integrator,
wherein the light source device comprises a light source portion and an optical fiber bundle in which a plurality of optical fibers coupled to the light source portion are arranged and light is emitted from the plurality of optical fibers, and
the configuration of a light-emitting area formed at an end portion of the optical fiber bundle is, as seen from the light-emitting side, substantially similar to the contour configuration of the light-emitting surface of the optical integrator,
wherein an etendue of the light source is smaller than that of the two-dimensional spatial light modulator.

9. The exposure apparatus according to claim 8, wherein the optical integrator is a fly-eye type.

10. The exposure apparatus according to claim 8, wherein the optical integrator is a rod type.

11. The exposure apparatus according to claim 8, wherein the light source portion comprises a laser diode.

12. The exposure apparatus according to claim 8, wherein the light source portion comprises a plurality of laser diodes, and each of the plurality of optical fibers is coupled to the plurality of laser diodes.

13. The exposure apparatus according to claim 8, wherein the light source portion comprises a broad area type laser diode array including a plurality of emitters.

14. The exposure apparatus according to claim 8, wherein the two-dimensional spatial light modulator is a digital micromirror device.

15. The exposure apparatus according to claim 8, wherein the two-dimensional spatial light modulator is disposed in a tilted manner so that a predetermined angle is formed by a direction of a side of the two-dimensional spatial light modulator and a main scanning direction for exposure.

16. The exposure apparatus according to claim 15, wherein the predetermined angle is in the range of 0.1° to 1°.

17. The exposure apparatus according to claim 8, wherein a diameter of at least one of a core and a clad of each of the plurality of optical fibers is changed depending on the number of the plurality of optical fibers.

18. An exposure apparatus comprising a plurality of exposure heads,
wherein each of the plurality of exposure heads comprises a light source, an optical integrator to which light is supplied from the light source, and a two-dimensional spatial light modulator illuminated by light which has transmitted the optical integrator,
the light source comprises an optical fiber bundle in which a plurality of optical fibers are arranged and light is emitted from the plurality of optical fibers, and
the configuration of light-exiting area formed at an end portion of the optical fiber bundle is, as seen from the light-exiting side, substantially similar to the contour configuration of the light-emitting surface of the optical integrator,
wherein an etendue of the light source is smaller than that of the two-dimensional spatial light modulator.

19. The exposure apparatus according to claim 18, wherein the plurality of exposure heads are arranged in a substantial matrix in which a plurality of exposure head rows, in each of which the exposure heads are arranged in a line along the main scanning direction for exposure, are arranged along a sub scanning direction for exposure, and the exposure heads in the respective rows are arranged so as to be shifted by a predetermined interval.

20. The exposure apparatus according to claim 1 wherein an etendue level of the light source is less than 80 mm$^2$·str.

21. The exposure apparatus according to claim 1, wherein the light source comprises a non-uniform light distribution intensity light source.

22. The apparatus of claim 1 wherein the light source comprises plural laser sources inputting light to a common fiber.

23. The apparatus of claim 5, wherein the predetermined angle comprises a non-zero angle and a non-right angle.

24. The apparatus of claim 6, wherein the predetermined angle represents a rotation about an optical axis, said optical axis being normal to a surface of the spatial light modulator and said predetermined angle is defined relative to the main scanning direction.

* * * * *